Aug. 1, 1950   J. B. CLAY   2,517,086
FARM GATE
Filed Jan. 17, 1948

INVENTOR.
Joseph B. Clay
BY
Bair & Freeman
Attys.

Patented Aug. 1, 1950

2,517,086

UNITED STATES PATENT OFFICE 2,517,086

FARM GATE

Joseph B. Clay, Cedar Falls, Iowa, assignor to Clay Equipment Corporation, Cedar Falls, Iowa, a corporation of Iowa Application January 17, 1948, Serial No. 2,939

2 Claims. (Cl. 160—378)

This invention relates to a gate and particularly a non-sag gate.

An object of the present invention is the provision of such a gate having certain structural members formed of a novel construction.

Another object of the present invention is the provision of a gate having end upright structural members which are tubular in construction possessing the appearance and strength of tubular members and having portions formed of channel shape, the members thereby possessing the advantages of channel members.

A further object is the provision of a gate construction having end upright members and horizontal members pivoted in the upright members in which is provided a novel means of pivotally securing the horizontal members in the upright members.

A still further object of the invention is the provision of a gate as referred to above having a wire mesh segment in which the wire mesh is secured to the end upright members in a novel manner.

Still another object is the provision of spring steel tubular structural members of a gate which are slotted longitudinally along one side, the edges defining the slot being biased together for gripping the wire mesh.

A still further object is the provision of a novel gate structure which presents a more finished appearance than any gate structures heretofore made.

With these and other objects in view, my invention consists in the construction, arrangement, and combination of the various parts of my farm gate whereby the objects contemplated are attained, as hereinafter more fully set forth, pointed out in my claims, and illustrated in the accompanying drawings, wherein:

Figure 1:
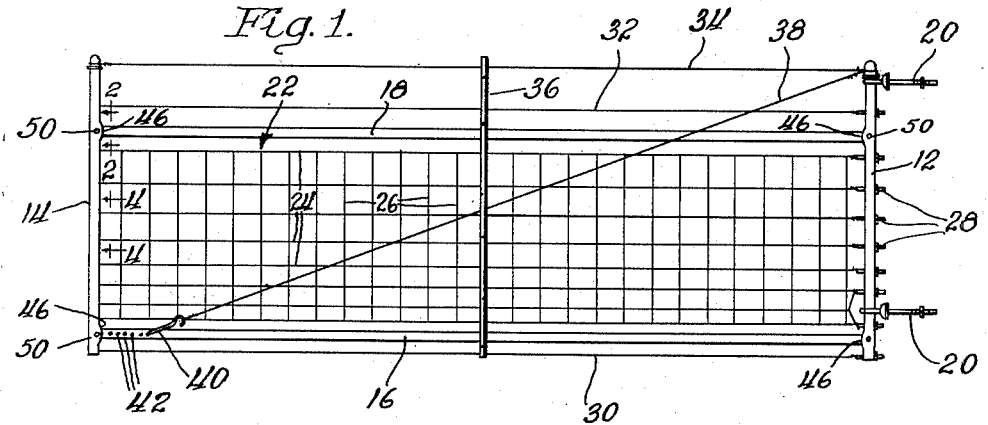
Figure 1 is a view of a gate made according to the present invention.

Referring in detail to the drawings, the gate illustrated in Figure 1 includes end upright tubular members 12 and 14 and includes a lower horizontal member 16 and an upper horizontal member 18. The detailed construction of the end members 12 and 14 and the manner of securing the horizontal members 16 and 18 therein will be referred to later in detail. The members 12, 14, 16, and 18 form the main structural members of the gate and are included with certain other elements to make up the entire gate.

The upright end member 12 forms the hinge end of the gate and is provided with eye bolts 20 for securing the gate to a post set in the ground. The tubular end member 12 is adapted to rotate in the eyes of the eye bolts 20 whereby the gate as a whole can swing about the end member 12 as a pivot point.

A wire mesh 22 containing horizontal strands 24 and vertical strands 26 is secured in the gate. One end of the mesh is secured in the tubular upright member 14 at the swinging end of the gate in a manner to be described later. The other end of the wire mesh 22 is secured in the upright member 12 at the hinge end of the gate by means of a plurality of bolts 28 extending through holes in the member 12. The bolts 28 are secured to the ends of the horizontal strands 24 and are provided with nuts on the outer ends thereof for purposes of drawing the wire mesh taut.

Certain other wires may be provided, such as a lower strand 30 below the lower horizontal member 16 and upper strands 32 and 34. The strands 30, 32, and 34 may be barbed wire if desired to prevent the farm animals from attempting to pass over or under the gate. The strands 30 and 32 may be secured in the end members 12 and 14 in a manner similar to the wire mesh 22. The upper strand 34 may be simply secured around the caps on the upper ends of the end members 12 and 14. An intermediate reinforcing member 36 may be provided if desired for securing the wire mesh and the other strands of wire in position in the plane of the gate. For this purpose, the member 36 may be secured to the horizontal members 16 and 18.

A guy wire 38 is secured to the upper end of the end member 12 at the hinge end of the gate and extends diagonally downwardly across the gate. At the lower end of the guy wire 38 is a hook 40 adapted to fit in any of the plurality of holes 42 in the lower horizontal member 16 adjacent the swinging end of the gate. By placing the hook 40 in different ones of the holes 42, the gate as a whole can be tilted upwardly or downwardly. The hook can be placed in one of the holes nearer the swinging end of the gate to take up any sag in the gate which may occur after continued use.

The end upright members 12 and 14 are, for the most part, identical. A description of the features which both have in common will first be given.

Each vertical member 12 and 14 is illustrated as tubular in formation, having a longitudinal slot or seam 44 on one side thereof, and each having sockets 46 positioned respectively adjacent the upper and lower end. Each tubular member 12 and 14 is formed of a flat piece of steel, which may be spring steel, semi-spring steel or low carbon, mild steel. I prefer semi-spring steel although it will be understood that other kinds can be used. Certain holes are pierced in the flat pieces, placed for proper positioning in the finished tubular members for use with their assembly in the gate.

In the process forming the tubing or tubular members 12 and 14, the flat pieces are first bent into U-shape, and then the portions 48 which form the sockets 46 are held in their position, and the remainder of the pieces are formed into tubular shape, forming the slots or seams 44. Thus the portions 48 form the sockets 46 which thereby open from the interior of the tubular member outwardly in a direction transverse to the axis thereof.

The vertical members 12 and 14 are positioned in the gate so that the slots or seams 44, and the sockets 46 face inwardly toward each other and lie in the plane of the gate. The ends of the horizontal members 16 and 18 are inserted in meeting sockets 46. The vertical positioning of the sockets 46 is such as to position the horizontal members 16 and 18 at the desired levels. The edges or portions 48 of each socket are provided with pierced holes, referred to above, disposed transverse to the axis of the tubular member and in register with similar holes in the ends of the horizontal members 16 and 18. Bolts 50 are then passed through the registering holes for securing the horizontal members 16 and 18 in the sockets 46. The horizontal members are provided limited pivotal movement within the sockets, pivoting about the bolts 50.

The edges 48 forming the sockets 46 are curved at their mid portions similarly to the curvature of the horizontal members 16 and 18 which in the present instance are themselves tubular elements. Although the curvature of the edges 48 follows closely the curvature of the horizontal members 16 and 18, the latter are not prevented from pivoting. If desired, the curvature of the edges 48 can be formed following a curvature of a diameter greater than the diameter of the horizontal members 16 and 18.

The pivotal feature of the horizontal members 16 and 18 in the end members 12 and 14 permits the swinging end of the gate to be raised and lowered in the plane of the gate.

Figure 4:
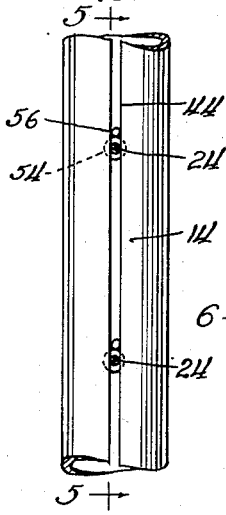
Figure 4 is an enlarged view taken on line 4—4 of Figure 1.
Figure 5:
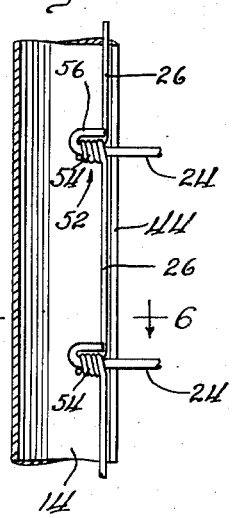
Figure 5 is a view taken on line 5—5 of Figure 4.
Figure 6:
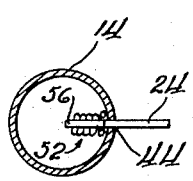
Figure 6 is a sectional view taken on line 6—6 of Figure 5.

Figures 4, 5, and 6 illustrate a method in which the wire mesh 22 is secured in the tubular end member 14 at the swinging end of the gate. The horizontal and vertical strands 24 and 26 of the wire mesh 22 are secured together at their points of juncture in the form of twisted knots illustrated at 52. The method of forming these knots is conventional. The ends of the segments forming the vertical strands 26 are twisted around the horizontal strands as indicated at 54 and the end of each horizontal strand 24 is bent back over the twisted portion 54 as indicated at 56.

The tubular member 14 is opened up by means of spreading the edges defining the slot 44, to an extent substantially the thickness of the strands 24 of the wire. The tubular member is then slid endwise over the wire mesh 22, confining the knots 52 in the end marginal edge of the mesh in the interior of the tubular member. Upon release of the edges defining the slot, the latter spring together and bias against the wire mesh. The knots abutting against the edges defining the slot prevents the wire mesh from being drawn out of the slot.

The bottom strand 20 and the strand 32 may be secured in the tubular member 14 in a similar manner.

Figure 2:
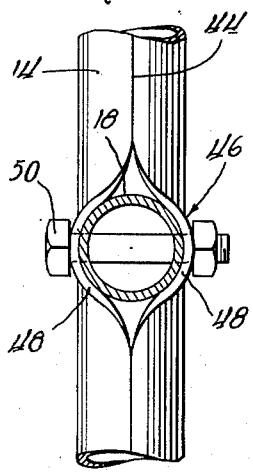
Figure 2 is an enlarged view taken on line 2—2 of Figure 1.
Figure 3:
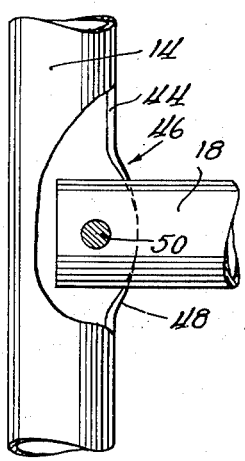
Figure 3 is a view taken from the left of Figure 2 a part of the figure being broken away.

Figure 2 illustrates the slot 44 closed immediately adjacent the socket 46. This is merely a representation of the slot, and if the wire mesh or other strands of wire are positioned closely adjacent the socket, the slot may not close up entirely, but be spread slightly as indicated in Figure 4.

Certain of the pierced holes referred to above occur in the finished tubular member 12 at the hinge end of the gate, properly located for receiving the bolts 28.

It may be noted at this point, that all necessary holes in either tubular member 12 or 14, may be formed in a single operation, before the flat pieces are shaped into tubular form. Obviously the holes can be formed by any desired method, by piercing, drilling, etc.

It will be understood that the wire mesh and individual strands of wire may be secured in the tubular member 12 in a manner similar to the manner of securement at the swinging end, although I prefer to employ the bolts 28 for purposes of retaining the wire taut.

It will be seen that the tubular members 12 and 14 possess substantially all of the strength and appearance of conventional tubular elements. They are also advantageous in being provided with the novel sockets 46 for reception of the horizontal members and, for this reason, possess the advantages of channel members. The manner of concealing the ends of the horizontal members 16 and 18 and the ends of the wire mesh and other wire strands presents a pleasing appearance that has not been accomplished in gates of this type before.

It will also be evident from the foregoing that the gate construction possesses economy due to the simplicity in construction and method of securing the various elements together.

Some changes may be made in the construction and arrangement of the parts of my gate without departing from the real spirit and purpose of my invention, and it is my intention to cover by my claims such modified forms of structure or use of mechanical equivalents as may be reasonably included within their scope.

I claim as my invention:

1. A gate comprising, in combination, a pair of spaced, vertical, tubular members of semi-spring steel, each tubular member being slotted longitudinally on one side thereof, the edges defining each slot being separable and tending to spring together, portions of the edges defining each slot being permanently deformed and spread apart relatively to each other to form sockets, horizontal members having their ends pivoted in respective sockets, connecting the vertical members together, and wire mesh secured in the gate, said wire mesh including transverse strands interconnected in knots, said wire mesh having one end thereof and certain of said knots extending into the slot in one of said vertical members and retained therein by the edges defining the slot springing together and bearing on said knots, and means cooperable with the opposite one of said vertical members for securing the respective end of the wire mesh and drawing the wire mesh taut.

2. A gate comprising, in combination, a pair of spaced, vertical tubular members, each tubular member being slotted lonigtudinally on one side thereof, the edge defining each slot being separable and tending to spring together, portions of the edges defining each slot being permanently deformed and spread apart relatively to each other to form sockets, said sockets being substantially tubular with their axes disposed perpendicular to the axis of the respective vertical tubular member, each socket being of the same transverse dimension as the vertical tubular member throughout a substantial portion of the socket, the edges defining the sockets merging into the edges defining the slots and the slots extending into close proximity with the sockets, horizontal members having their ends pivoted in respective sockets, connecting the vertical members together, and wire mesh secured in the gate, said wire mesh including transverse strands interconnected in knots, said wire mesh having one end thereof and certain of said knots extending into the slot in one of said vertical members and retained therein by the edges defining the slot springing together and bearing on said knots, and means for securing the opposite end of the wire mesh to the opposite vertical tubular member.

JOSEPH B. CLAY.

REFERENCES CITED

The following references are of record in the file of this patent:

UNITED STATES PATENTS

| Number | Name | Date |
|---|---|---|
| 926,010 | Liles | June 22, 1909 |
| 1,128,839 | Bentz et al. | Feb. 16, 1915 |
| 1,215,728 | Slauson | Feb. 13, 1917 |
| 2,039,824 | Morgan | May 5, 1936 |
| 2,183,331 | Farmer | Dec. 12, 1939 |